United States Patent [19]
Schwab

[11] Patent Number: 5,759,233
[45] Date of Patent: Jun. 2, 1998

[54] VENTURI SCRUBBER AND METHOD OF USING THE SAME

[75] Inventor: James J. Schwab, Napa, Calif.

[73] Assignee: Envirocare International, Inc., Novato, Calif.

[21] Appl. No.: 565,022

[22] Filed: Nov. 30, 1995

Related U.S. Application Data

[60] Division of Ser. No. 182,639, Jan. 14, 1994, Pat. No. 5,484,471, which is a continuation-in-part of Ser. No. 904,208, Jun. 25, 1992, Pat. No. 5,279,646.

[51] Int. Cl.⁶ ............................................. B01F 3/04
[52] U.S. Cl. ................. 95/8; 95/13; 95/23; 261/DIG. 54
[58] Field of Search ........................ 95/8, 9, 13, 23, 95/198, 199, 200, 201, 202, 203; 55/228; 261/DIG. 54

[56] References Cited

U.S. PATENT DOCUMENTS

| | | |
|---|---|---|
| 2,792,070 | 5/1957 | Strunk .......................... 95/23 |
| 3,768,234 | 10/1973 | Hardison .................. 261/DIG. 54 |
| 3,993,460 | 11/1976 | Gooch et al. ................. 261/79.2 |
| 4,141,701 | 2/1979 | Ewan et al. ............... 261/DIG. 54 |
| 4,401,444 | 8/1983 | Teller ....................... 261/DIG. 54 |
| 4,469,493 | 9/1984 | Touvinen et al. ........... 261/DIG. 54 |
| 4,735,636 | 4/1988 | Roberts ............................... 95/8 |

*Primary Examiner*—Tim R. Miles
*Attorney, Agent, or Firm*—Coudert Brothers

[57] ABSTRACT

An air pollution control system incorporating a venturi scrubber and a method of cleansing a particulate-laden, contaminated gas flow are disclosed. Spray nozzles are used to introduce optimized droplets of a scrubbing liquid into the venturi to maximize particle collection efficiency. The present invention discloses automatic control systems which adjust the venturi as the properties of the effluent gases change. For example, in one embodiment, the spray volume and/or droplet size is adjusted as the particle concentration changes. In another embodiment, the spray volume is increased as the volume of effluent gas decreases.

9 Claims, 9 Drawing Sheets

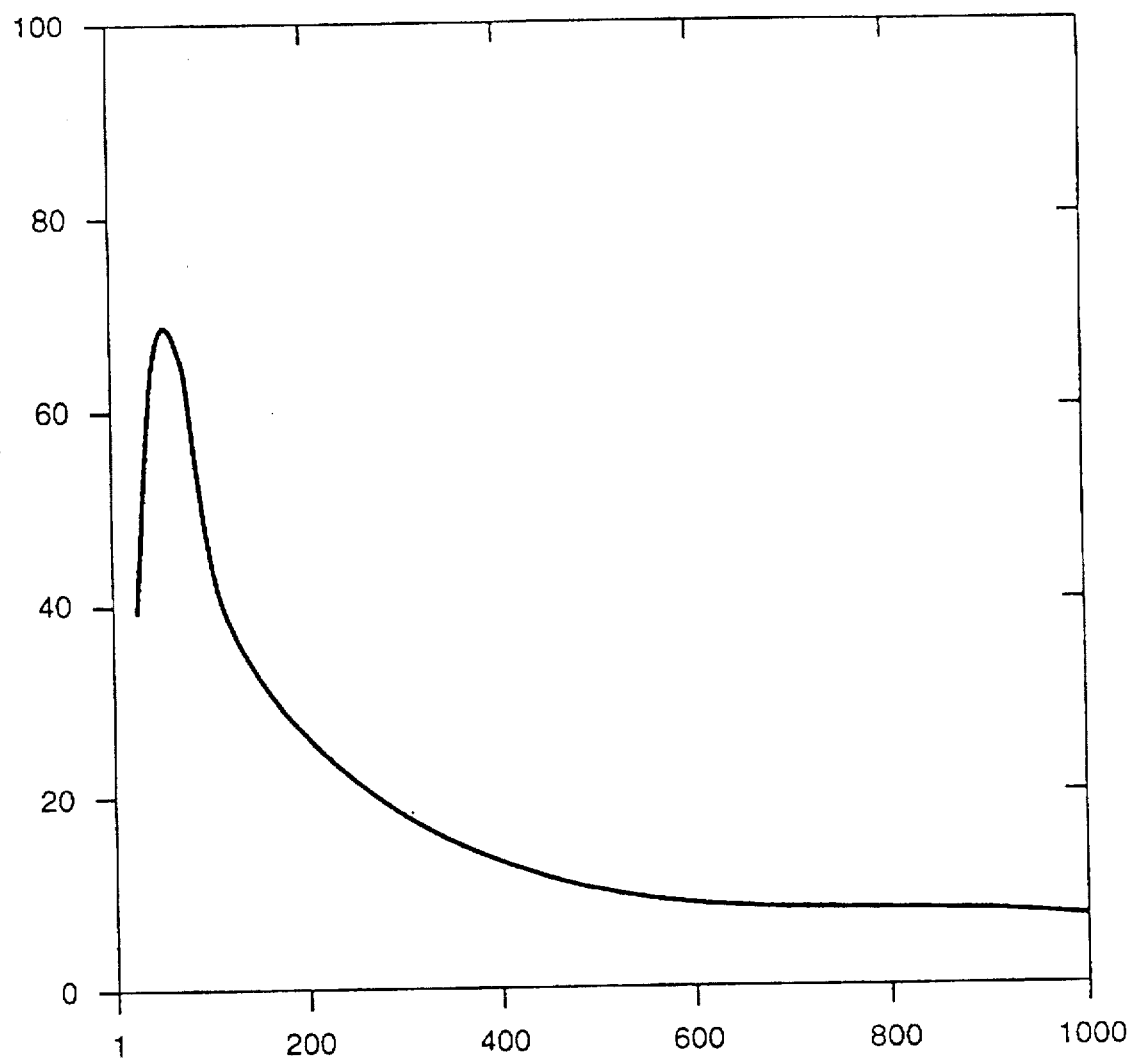
FIG._6A

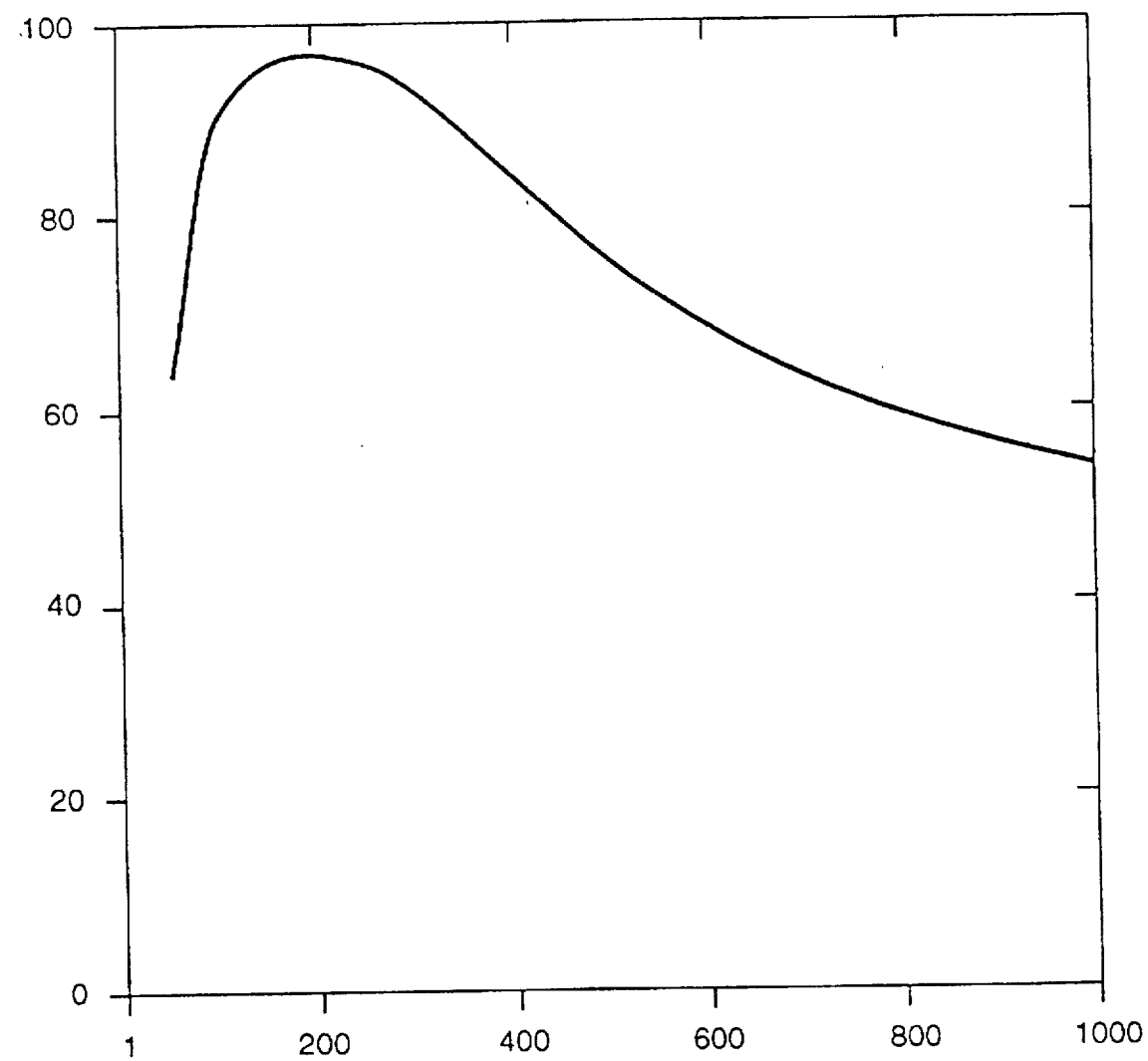
FIG._6B

VENTURI SCRUBBER AND METHOD OF USING THE SAME

This is a division, of application Ser. No. 08/182,639 filed Jan. 14, 1994, now U.S. Pat. No. 5,484,471, which was a continuation-in-part of application Ser. No. 07/904,208 filed Jun. 25, 1992, now U.S. Pat. No. 5,279,646.

FIELD OF THE INVENTION

This invention relates to the field of air pollution control, and is particularly directed to an improved venturi wet scrubbing system for removing contaminants from a gaseous effluent stream, such as the output of an incinerator.

BACKGROUND OF THE INVENTION

Over the past several decades the control of air pollution has become a priority concern of society. The United States, and other countries, have developed highly elaborate regulatory programs aimed at requiring factories, and other major sources of air pollution, to install the best available control technology (BACT) for removing contaminants from gaseous effluent streams released into the atmosphere. The standards for air pollution control are becoming increasingly stringent, so that there is a constant demand for ever more effective pollution control technologies. In addition, the operating costs of running pollution control equipment can be substantial, and so there is also a constant demand for more efficient technologies.

Concerns about pollution control are directed to more than air pollution, and removing contaminants from one medium frequently results in their introduction into another. For example, the treatment of municipal wastewater under the Clean Water Act has resulted in an enormous increase in the amount of sewage sludge that must be disposed of. Many communities lack adequate disposal sites to discard sludge that is generated by their municipal wastewater treatment plants in landfills, and are turning to incineration as an alternative method of disposal. Incineration of sludge, or other waste products, while greatly reducing the volume of material that must be disposed of on land, may result in the release of contaminants in the sludge into the atmosphere. In this regard, it is noted that the sludge generated by many municipalities is contaminated by highly toxic heavy metals and organic compounds, as well as acidic compounds such as chlorides and sulfates. The release of such compounds into the atmosphere is highly regulated, and sludge incineration systems are required to use BACT for controlling the release of contaminants into the atmosphere.

One well known type of device for removing contaminants from a gaseous effluent stream is a venturi scrubber. Venturi scrubbers are generally recognized as having the highest fine particle collection efficiency of available scrubbing devices. As the name implies, in a venturi scrubber the effluent gas is forced or drawn through a venturi tube having a narrow "throat" portion. As the gas moves through the throat it is accelerated to a high velocity. A scrubbing liquid in the form of droplets, typically of water, is added to the venturi, usually at the throat, and enters the gas flow. The water droplets used are generally many orders of magnitude larger than the contaminant particles to be collected and, as a consequence, accelerate at a different rate through the venturi. The differential acceleration causes interactions between the water droplets and the contaminant particles, such that the contaminant particles are collected by the water droplets. The collection mechanisms involve, primarily, collisions between the particles and the droplets and diffusion of particles to the surface of the droplets. In either case, the particles are captured by the droplets. Depending on the size of the contaminant particles, one or the other of these mechanisms may predominate, with diffusion being the predominant collection mechanism for very small particles, and collision or interception being the predominant mechanism for larger particles. A venturi scrubber can also be efficient at collecting highly soluble gaseous compounds by diffusion. A detailed description of these scrubbing mechanisms is discussed in Chapter 9 of *Air Pollution Control Theory*, M. Crawford, (McGraw-Hill 1976).

After the particulate contaminants are collected by the water droplets, the water droplets are then removed from the effluent stream which is thereby cleansed. Removal of the water droplets may be accomplished by a number of known means. The various removal methods rely on the fact that the water droplets are relatively large and, due to inertia, cannot change direction rapidly. For example, the gas flow may be directed toward a surface such as an impingement plate. While the gas moves around the surface, the inertia of the relatively large water droplets causes them to strike the surface where they are captured. Likewise, if the droplets are subjected to a circular flow, as in a cyclonic separator, the large droplets will collide with the wall of the separator due to centripetal force.

Most venturi scrubbers in use today are "self-atomizing," i.e., the droplets are formed by allowing a liquid to flow into the throat of the venturi where it is atomized by the gas flow. While very simple to implement, this method is not able to produce droplets of very small median diameter. Although not much utilized in commercial embodiments, it has previously been taught that the collection efficiency of a venturi scrubber is related to the size of the water droplets used in the scrubber. In particular, it has been taught that the collection efficiency increases as the surface area of the water droplets used in the scrubber, and it is well known that the surface area of a given quantity of liquid increases with decreasing droplet size. Thus, given this teaching, it would seem that the droplet size of the scrubbing liquid should be reduced to the minimum.

However, as recognized by the inventor hereof and as taught herein, there is a point at which a further decrease in the size of the droplets of the scrubbing liquid begins to become detrimental. As a practical matter, prior art venturi scrubbing devices, even those which claimed to utilize very fine droplets, actually utilize droplets which are much larger than is optimal according to the teachings hereof.

The primary methods heretofore utilized in improving the collection efficiency of a venturi scrubber have been to decrease the size of the throat or to increase the overall rate at which gas flows through the system. Both of these methods increase the differential velocities between the contaminant particles and liquid droplets as they pass through the throat of the venturi. This causes more interactions between particles and droplets to occur, thereby improving contaminant removal. However, increasing the collection efficiency in this manner comes at a cost of significantly higher energy input into the system, thereby resulting in higher operating costs. The extra energy is expended due either to the increased overall flow resistance attributable to the reduced throat diameter, or to the increased overall flow rate through the venturi. In either case, the pressure drop across the venturi is increased and greater pumping capacity is required. Accordingly, heretofore, efforts to increase the fine particle collection efficiency of a venturi scrubber have involved substantial increased energy input into the system.

Of particular concern to those in the field of air pollution control is the collection of "optically active" particles. As used herein, the term "optically active particles" should be understood to mean particles having a diameter in the range of approximately 0.1 to 1.0 microns. These particles are difficult to collect in conventional venturi scrubbers due to their small size. Nonetheless, particles in this size range often comprise toxic material the release of which is not permitted. Due to the relatively large surface area of optically active particles, they absorb a disproportionate amount of heavy metal contamination. As their name implies, optically active particles interact with light. Even if they do not contain toxic components, the emission of optically active particles is highly visible and undesirable from an aesthetic point of view. Particles which are larger in diameter than about 1.0 micron are also sometimes considered optically active. However, the present invention is not directly concerned with the collection of these larger particles and they have, therefore, not been included in the definition of the term optically active as used herein. It is considered that particles larger than 1.0 micron in diameter are relatively much easier to collect.

As noted above, municipal sewage sludge often contains significant amounts of toxic heavy metal and organic materials. Heretofore, scrubbers have not been efficient in removing these materials from the gaseous effluent of incinerated sludge. Municipal sewage sludge incineration typically requires the use of high temperatures (i.e., between 800°–1200° F.). At these elevated temperatures, the organic materials are vaporized and are, thus, not susceptible to efficient scrubbing. One approach to this problem has been to use an afterburner on the effluent stream, whereby the organic vapors are combusted and, thereby, transformed into non-toxic compounds, primarily water vapor and carbon dioxide. However, incomplete combustion of the organics can result in the production of carbon monoxide, soot, and/or gaseous hydrocarbons. If soot (i.e., fine particles of carbon) is produced, other compounds, such as those containing heavy metals, can be adsorbed on the surface of the carbon particles. Any particles that are formed in this way are likely to be difficult to collect due to their small diameter. And, as noted above, very small particles are efficient collectors of volatile heavy metals.

One approach to solving the problem of incomplete combustion in an afterburner involves placing the afterburner downstream of the scrubbing stage(s) rather than upstream as is traditional. This allows removal of particles prior to afterburning, and allows for more efficient afterburning. This prior art method also involves cooling the gaseous effluent between the venturi stage and the afterburner stage. Cooling causes the condensation of certain materials which are then removed in a second scrubber. While this approach is believed to be an improvement, it requires two venturi scrubbing stages to collect the particulates in the effluent stream.

Air pollution control systems employing venturi scrubbers are frequently used in situations where the flow of contaminated gas through the system varies over time. This is true, for example, with sewage sludge incineration systems of the type described, due to variations in the quantity and qualities of the sludge produced by a municipal wastewater treatment facility. As already described, most venturi scrubbers used in such applications rely on self-atomization to form scrubbing droplets. In such a system, the reduction in flow through the venturi accompanying any reduction in the amount of contaminated gas produced by the incineration system reduces the number of scrubbing droplets formed, thereby adversely affecting the scrubbing efficiency. Moreover, the reduced flow reduces the differential acceleration of droplets and particles through the venturi reducing scrubbing efficiency.

In addition, the concentration, size and nature of the particles leaving an incinerator (or other source of contaminated gas) will vary over time due to a number of factors. For example, the nature of the waste received by a municipal treatment works may dramatically change character over time. On weekends and at night, when many of the industrial sources connected to the sewer system are not operating, the amount of industrial waste received by the system may be greatly reduced. Likewise, the operation of an incinerator may vary with a large number of factors, making it hard to optimize all the parameters to continuously achieve maximum combustion efficiency. In order to comply with regulatory requirements, the scrubbing system must be capable of effective operation when faced with maximum particulate loading of gas flow. The required maximum level of scrubbing is not likely to be necessary under all circumstances, and operating efficiencies can be achieved by reducing the scrubbing level when it is not needed.

Finally, as noted above, the removal of pollutants from one media often merely shifts the disposal problem to another media. A scrubber is effective in removing solid, liquid and gaseous pollutants from a contaminated gas flow. However, this results in the pollutants being captured in the scrubbing liquid. The contaminated scrubbing liquid must then be dealt with. In many systems the scrubbing liquid is recycled. However, if the scrubbing liquid is not first treated, recycling may result in the re-release of the contaminants into the gas flow. This is especially true of volatile pollutants which may reenter the vapor state.

Accordingly, it is an object of the present invention to provide an improved venturi scrubber that is capable of increased particle collection without the need to increase the rate of gas flow through the system or to decrease the size of the venturi throat.

Another object of the present invention is to provide an improved venturi scrubber wherein the size of the droplets used to collect contaminant particles is optimized.

Another object of the present invention is to provide a venturi scrubber having a high collection efficiency without the need for a commensurate increase in the energy input to the system, as compared to the prior art.

Yet another object of the present invention is to provide a nozzle for use in a venturi scrubber which has the characteristics needed to efficiently generate droplets having an optimal size for collecting optically active contaminant particles.

A further object of the present invention is provide a contaminant removal system for use with a municipal sewage sludge incinerator that is efficient in removing toxic heavy metal and organic contaminants.

Still another object of the present invention is to provide an air pollution control system which is capable of compensating for variations in the flow through the system.

Yet another object of the present invention is to provide an air pollution control system employing a venturi scrubber which is capable of adjusting to variations in the concentration of particles in the flow through the system.

A further object of the present invention is to provide an air pollution control system employing a venturi scrubber which addresses the need to properly handle the contaminated scrubbing liquid.

SUMMARY OF THE INVENTION

The foregoing objects of the present invention, and others that will be apparent to those skilled in the art after reading this specification in conjunction with the accompanying drawings and the appended claims, are realized by a novel air pollution control system. In its basic form, the present invention comprises a venturi scrubber having means for introducing droplets of a scrubbing liquid having a predetermined optimal median diameter. In the preferred embodiment, the optimal median diameter of the scrubbing liquid droplets is between 10 and 200 microns. This corresponds to being between about two and three orders of magnitude greater than the median diameter of the optically active particles in the effluent, or, more specifically, between about 100 to 500 times the diameter of such particles. In one embodiment, a spray nozzle designed to form droplets of the desired diameter comprises means for flowing a mixture of the scrubbing liquid and a gas under pressure through an orifice. By controlling the respective pressures at which the liquid and the gas are delivered to the nozzle, both the rate and the size of droplet production can be independently adjusted. In another embodiment of the present invention an hydraulic bypass nozzle is employed. This type of nozzle also provides independent, control over the volume of liquid sprayed into the venturi. In another aspect of the present invention, the effluent entering the venturi scrubber is precooled, preferably to a temperature below 120° F., to cause formation of collectable particles of condensable materials in the effluent flow. Optionally, an afterburner may be added downstream of the venturi to cause combustion of any organic vapors remaining in the effluent flow after scrubbing.

In a further aspect, the present invention incorporates an automated control system which continuously monitors a property of the gas flow through the system and adjusts the venturi scrubber to compensate for variations in the property being monitored. In one embodiment, the volume of gas flow is monitored and the volume of liquid is adjusted to compensate for reduced gas flow. Preferably, the volume of scrubbing liquid is increased as the gas flow decreases. In another embodiment, the concentration of particles which travel through the system is monitored and the scrubbing liquid spray is adjusted to compensate for variations in the particles concentration. Preferably, if the concentration of particles increases, the volume of liquid sprayed is increased and/or the size of the droplets used in the venturi scrubber is reduced.

The present invention also includes means for treating the scrubbing liquid after it has traveled through the venturi. The liquid is first collected and transported to an enclosed container. Due to the inapplicability of Henry's law to very fine droplets, (in particular, droplets of the size used in connection with the present invention to remove optically active particles from the effluent flow), gases dissolve in the droplets in excess of the quantities predicted by Henry's law. When the scrubbing liquid is reconsolidated into a large volume, the excess gas is released and bubbles are formed in the volume of liquid. These bubbles rise to the surface causing suspended fine particulate material to accumulate in a scum on the surface. This scum may then be removed by conventional means. The gas which is, preferably, directed to an incinerator, and the remaining liquid may be chemically treated, with or without recycling to the venturi.

BRIEF DESCRIPTION OF THE DRAWINGS

FIGS. 6A and 6B are graphs showing the calculated relationship between median spray droplet size and collection efficiency of 0.1 and 1.0 micron contaminant particles, respectively.

DETAILED DESCRIPTION

Figure 1:
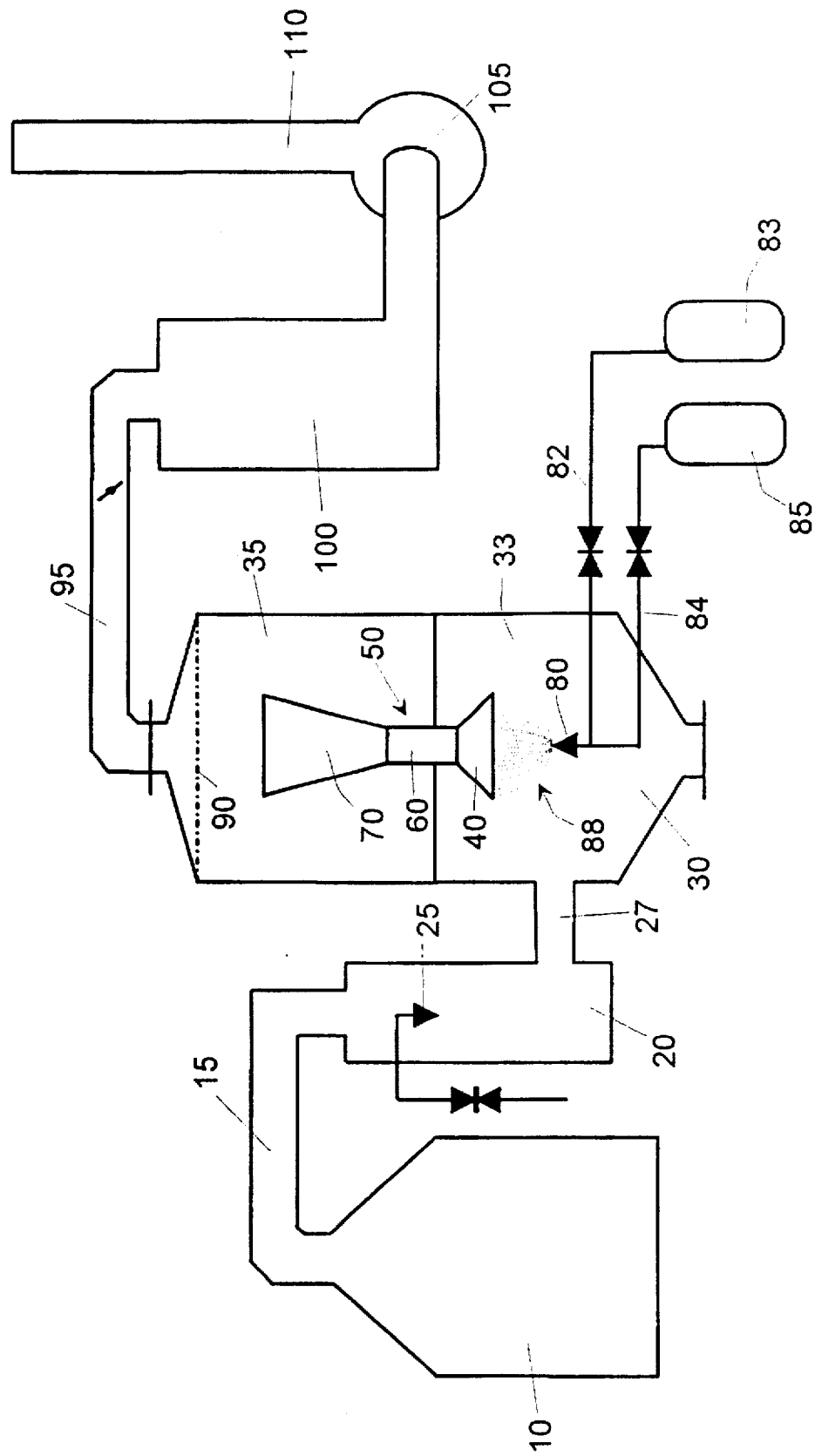
FIG. 1 is a partially schematic cross-sectional view of a air pollution control system according to the present invention.

Turning first to FIG. 1, an overall air pollution control system 1 of the present invention is shown. A contaminant laden gaseous effluent stream is generated by incinerator 10, for example a multiple hearth furnace used to incinerate sludge generated by a municipal wastewater treatment facility. As used herein, the term "gaseous effluent" is intended to include effluent streams that have liquid or solid particulate material entrained therein, including vapors which may condense as the effluent stream is cooled. While the present invention is described, for exemplary purposes, in conjunction with an incinerator, incinerator 10 is not considered to be a part of the present invention. The air pollution control system 1 of the present invention will be equally useful in conjunction with other sources of contaminated gaseous effluent. It should be noted that many sources of air pollution involve what is, at least initially, a very hot effluent stream created as a result of a combustion process.

Incinerator 10 produces a high volume of contaminated gases at a temperature which may be as hot as 1200° F. These gases leave incinerator 10 via duct 15 and flow into precooling chamber 20. In precooling chamber 20 the gases are cooled to a much lower temperature, preferably below about 120° F. Many methods of cooling a hot effluent gas flow are know to those skilled in the art and may be used in connection with the present invention. One method, depicted schematically in FIG. 1, involves spraying a cooling liquid, such as water, into the gas through nozzle 25. Cooling the effluent causes condensable vapors in the effluent stream to undergo a phase transition. While water will usually be the primary condensable compound present in the effluent stream, other condensable compounds of greater concern, such as acid gases and organic materials, are also often present in quantities of concern. Condensation of these vapors will naturally occur around particles in the effluent stream which serve as nucleation points. Precooling the effluent stream is, thus, useful for two reasons. First, condensable contaminants are transformed to the liquid phase and are thereby more easily removed from the effluent. Second, the nucleation process increases the size of preexisting particles in the effluent, thereby making it easier to remove them. In addition, removal of water vapor from the effluent stream can result in a substantial reduction in the volume of gaseous effluent that must be processed. Precooling of an effluent stream to cause condensation is sometimes also referred to as subcooling. It is estimated that, in some instances, subcooling will reduce the overall volume of the effluent stream by more than fifty percent.

After flowing through precooling chamber 20, the cooled effluent exits via duct 27 and enters venturi scrubbing chamber 30, comprising lower and upper portions 33 and 35, respectively. Venturi scrubbing chamber 30 is shown in greater detail in FIG. 2. The particulate laden gas stream enters lower chamber 33, within which is located entrance or inlet cone 40 of venturi 50. Venturi 50 also includes a throat portion 60, and an outlet or discharge cone portion 70, which are conventional. A two-fluid nozzle 80 forms a spray of scrubbing liquid having droplets which are optimized for maximum collection of optically active particles. A discussion of the operation of nozzle 80, and of the formation of droplets having an optimal median diameter, is set forth below.

Preferably, inlet cone 40 has a greater included angle than is typically used in venturi scrubbers. Preferably, the included angle of the inlet cone is between 60° and 90°, whereas prior art venturi scrubbers generally are in the range of 30°–45°. The relatively larger included angle comes at some cost in the energy required to move gas through the venturi, but improves scrubbing efficiency by maximizing the differential velocity between the contaminant particles and the scrubbing droplets.

Figure 4:
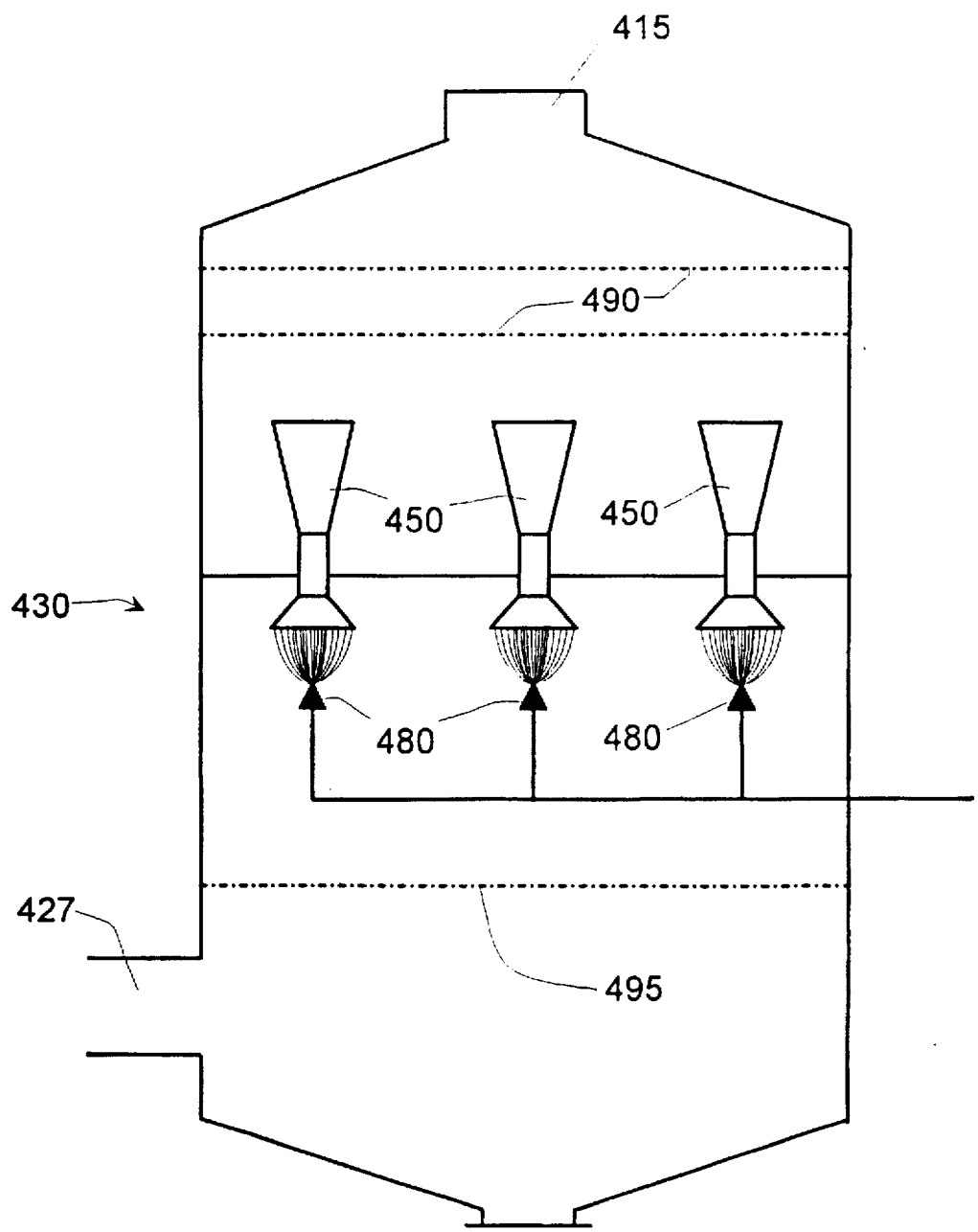
FIG. 4 is a partially schematic cross-sectional view of still another embodiment of the venturi scrubber of the present invention.

Effluent in venturi chamber 30 passes through venturi 50, where the spray droplets remove contaminant particles in the manner previously described. In one embodiment of the present invention the throat velocity of the effluent gas is 200–500 feet per second, and the scrubbing liquid is introduced at a rate of 1–10 gallons per 1000 actual cubic feet per minute (acfm) of effluent passing through the venturi. Preferably, the scrubbing liquid is uniformly introduced across the entire venturi input 40. After leaving venturi 50, the contaminant laden spray droplets are removed from the effluent stream by impingement plate 90 or by a demister 790 (see FIG. 7). In an alternate embodiment, as impingement stage is placed prior to the venturi as shown in FIG. 4. If desired, more than one impingement plate may be utilized. Use of an impingement plate upstream of the venturi serves to further cool the effluent flow, to remove large particles and abrasives from the effluent stream and for absorption of gaseous compounds.

The cleansed effluent stream then exits venturi chamber 30 via duct 95 and flows to an optional afterburner 100 where any remaining organic gases in the effluent stream are burned. Afterburner 100 must raise the temperature of the effluent gas to a suitably high temperature, and the gases must be held at this temperature in the presence of sufficient oxygen for a sufficient time to cause complete combustion. The optimal parameters for temperature, residence time and oxygen level will often involve engineering tradeoffs and will depend on the specific application. The use of an afterburner to burn organic materials in an effluent stream is well known, although normally the afterburner is positioned upstream of the scrubber. Although the gases entering afterburner 100 of the present invention are much cooler than if the afterburner were placed downstream of scrubber 30, the removal of condensable vapors from the effluent, particularly the removal of the very large volume of water vapor, offsets the energy required to reheat the effluent to combustion temperature.

After leaving afterburner 100, or if no afterburner is used, the effluent gas stream may be discharged into the atmosphere via stack 110, or may undergo further processing such as heat extraction. Gas flow through the entire pollution control system is propelled by induced draft fan 105.

As noted above, the present invention uses a two fluid nozzle 80 to form spray droplets having a median diameter which is optimized to collect optically active particulates in the effluent stream. Nozzle 80 is fed by a source of pressurized scrubbing liquid 83, which is conveyed to the nozzle via feed tube 82, and a source of pressurized gas 85, which is conveyed to nozzle 80 via feed tube 84. In many applications, air and water are used as the gas and liquid, respectively, for convenience and to minimize operating costs. The water used in the system may be recycled as is shown schematically in FIG. 3. However, before the water is recycled, it is preferably treated as described below in connection with FIGS. 7 and 8.

Figure 2:
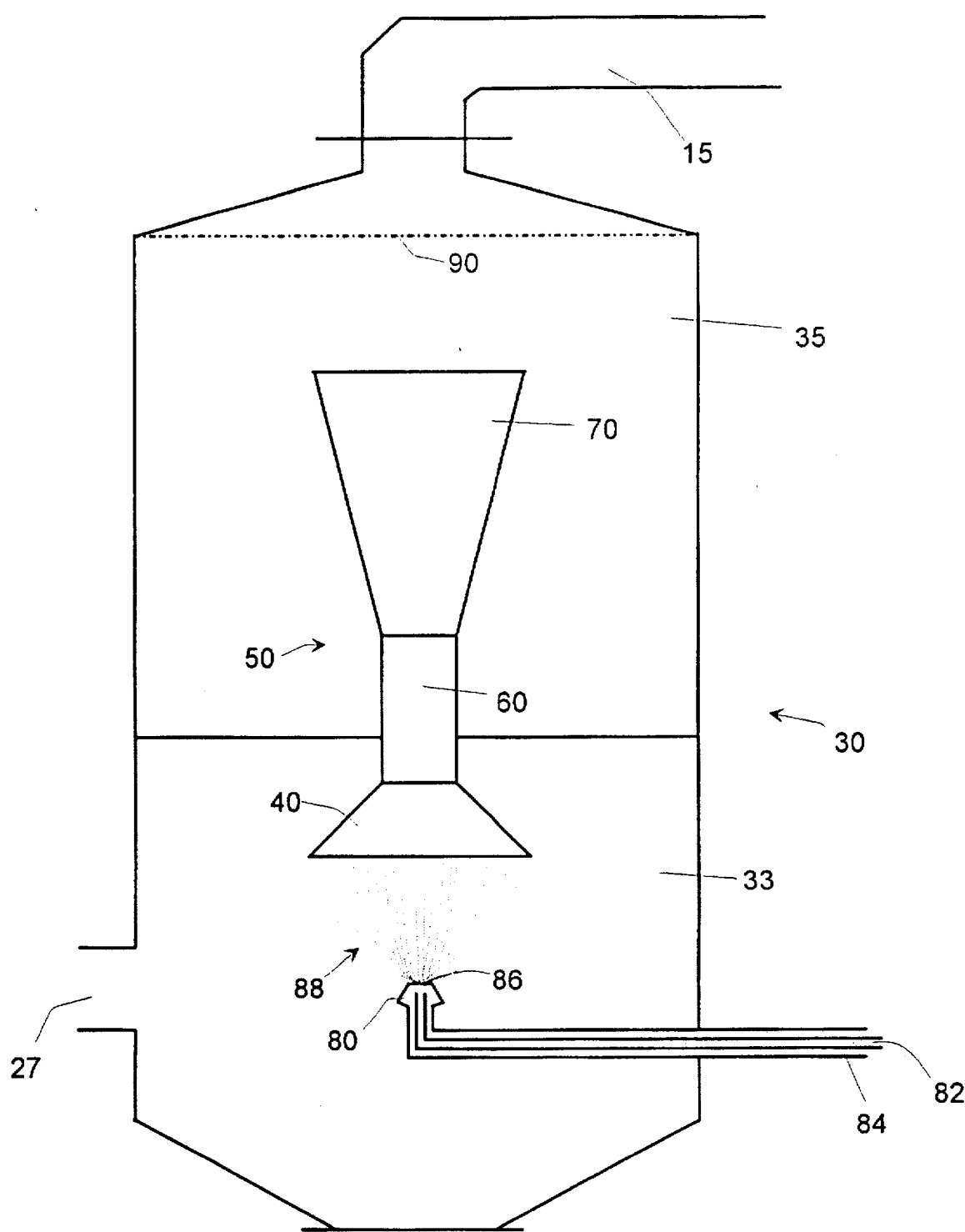
FIG. 2 is a partially schematic cross-sectional view of one embodiment of a venturi scrubber of the present invention.

Although FIG. 2 shows liquid feed tube 82 residing within and concentric with gas feed tube 84, it will be apparent to those skilled in the art that other arrangements are possible and may, in fact, be preferred. The two fluids mix just before an orifice 86 forming a spray 88 as they leave orifice 86 under pressure. A two fluid nozzle of the type which is used in the present invention is commercially available from Delavan, Inc., of Lexington, Tenn.

A variety of measures are used to characterize the diameter of the droplets in a spray. As used herein the term median diameter is intended to refer to what is more precisely termed the median volume diameter (MVD), sometimes referred to as the volume median diameter (VMD). The median volume diameter is the droplet size such that fifty percent of the total volume of liquid sprayed is made up of droplets having a diameter larger than the median value and fifty percent of the total volume of liquid sprayed is made up of droplets having a diameter smaller than the median value. Preferably, the droplet distribution is uniform about the median value such that most of the volume of liquid sprayed is in the form of droplets having diameters close to the median value.

By controlling the flow and pressure of the gas and liquid entering nozzle 80, it is possible to independently control both the size of the droplets and the quantity of scrubbing liquid injected into the venturi. In particular, increasing the air pressure relative to the liquid pressure to the nozzle tends to decrease the size of the droplets produced, while increasing the water pressure increases the quantity of spray formed. Preferably, the droplets should have a median diameter the range of about 10 to 200 microns. Droplets in this size range are between about two to three orders of magnitude greater in diameter than the optically active particles in the effluent stream. More particularly, they are optimally about 100 to 500 times the diameter of the optically active particles in the effluent. The ability to independently adjust the characteristics of the spray may be useful where the characteristics of the effluent stream are variable. Thus, if the concentration or size of the optically active particles in the gas flow changes, the spray characteristics can be adjusted accordingly.

It is very difficult to obtain droplets of the preferred size without using a two-fluid nozzle. As noted above, most prior art venturi scrubbers rely on self-atomization, using energy from the fan to atomize the scrubbing liquid. Such systems do not rely on a nozzle to form droplets, but rather, introduce the scrubbing liquid directly into the throat of the venturi where it is atomized by the accelerating gas flow around it. Some prior art venturi scrubbers employ single fluid liquid nozzles to introduce a spray of scrubbing liquid into the venturi. It is very difficult to produce droplets in the preferred size range using a single fluid nozzle, and it is generally not possible to independently control droplet size and volume of liquid which is sprayed. One would have to resort extremely high nozzle pressure to obtain the desired degree of atomization and, even at high pressures, commercially available nozzles do not have the capacity to provide a large volume of liquid into the gas flow. There is no indication that any of the prior art devices known to the inventor is operated at the required pressure levels. For example, to produce droplets of the proper size, it is believed that a commercially available "fine spray" single fluid hydraulic nozzle from Spraying Systems Co. would have to be operated at over 800 psig liquid pressure, and, at that level would only deliver less than two gallons of liquid per minute to the venturi. Thus, while some prior art devices use liquid nozzles to form droplets, it is believed that prior art venturi scrubbers have not used droplets smaller than about 500–1000 microns in diameter. Single fluid nozzles have an added disadvantage in that they do not allow independent control over the droplet size and the volume of liquid sprayed by the nozzle.

There is one type of single fluid nozzle, a so-called high pressure hydraulic "bypass" nozzle, which does allow independent control over the amount of liquid sprayed and the size of the droplets. (This type of nozzle is sometimes called a "spill back" nozzle.) While less preferred than a two-fluid nozzle due to the need to operate at very high liquid pressure, the hydraulic bypass nozzle may be used in connection with the present invention since it provides the capability of independent control.

Spray from nozzle 80 is introduced near the venturi inlet in a low velocity section of the precooled effluent gas flow. Preferably, the spray is uniformly distributed over the entire inlet cone 40. As the gases, spray droplets, and contaminant particles are accelerated in the throat of the venturi, the differential velocity between the particles and droplets is maximized.

Certain teachings of the prior art suggest that the droplets used in a venturi scrubber should be as fine as possible. This vague prior art teaching is unqualified and unquantified, and proceeds from the simplistic view that the sole concern in scrubbing efficiency is the overall surface area of the scrubbing liquid droplets. Nonetheless, it is clear from the same teachings that the droplets being used are, in fact, much larger than those preferred in the present invention. As explained below, there is a lower limit to the preferred droplet size, and droplets which are much finer than this lower limit are less efficient in collecting contaminant particles.

The ability to optimize droplet size for maximum collection efficiency has been verified experimentally and has a theoretical explanation. For example, in one experiment, the inventor investigated the scrubbing efficiency of a spray having droplets roughly equal in size to the optically active particles in an effluent stream. This experiment determined that such a spray was relatively inefficient in scrubbing the effluent stream, contrary to the prior art teaching that finer droplets improved scrubbing efficiency.

The apparent theoretical explanation for this result is as follows. Venturi scrubbing relies on the differential velocity between scrubbing droplets and contaminant particles. The gaseous effluent and the spray droplets both enter the inlet cone of the venturi at relatively low velocities. Differential velocities are achieved primarily as the particles and droplets undergo acceleration through the throat of the venturi. Normally, the contaminant particulates, being much smaller and having much less mass, rapidly accelerate to attain the velocity of the surrounding gas in a very short distance. On the other hand, the scrubbing liquid droplets are normally much larger and more massive, so that it takes them much longer to attain the velocity of the gas stream. Typically, these droplets will not reach this ultimate velocity until the end of the throat or beyond the end of the throat.

Since it is the velocity differential which causes scrubbing, once the droplets and particles reach the same velocity the number of interactions between the two will reduced to the point of insignificance, and no further scrubbing will occur. When the droplets start out being roughly the same size as the contaminant particles, they accelerate at roughly the same rate as each other, and no substantial velocity difference is realized as they pass through the venturi. Thus, if the spray droplets are too fine, i.e., of the same order as the contaminant particles, scrubbing efficiency will be degraded.

Thus, the prior art teaching, that "finer is better," is good only to a point, after which any further reduction in droplet size actually degrades scrubbing efficiency. FIG. 6A shows the calculated relationship between collection efficiency (shown as percentage on the vertical axis) and scrubbing liquid droplet size (in microns on the horizontal axis) for contaminant particles having a diameter of 0.1 micron. It is seen that the optimal droplet size is approximately 50 microns, and that collection efficiency falls off rapidly when the droplets are either smaller or larger than this optimal size. FIG. 6B shows the calculated relationship between collection efficiency and scrubbing liquid droplet size for contaminant particles having a diameter of 1.0 micron, just beyond the range of optically active particles. In this instance, the optimal droplet size is almost 200 microns. While in this case the fall off in collection efficiency for droplets which are not optimal is not as dramatic as it is with the smaller 0.1 micron particles, it is still quite significant.

According to the present invention, it is possible to obtain spray droplets of any predetermined median diameter, so that scrubbing efficiency is enhanced. In the prior art, the primary method used to increase scrubbing efficiency has been to increase the gas flow rate through the venturi, either by narrowing the throat or by increasing the overall flow rate of gas through the system. In either case, significantly more energy is required due to the need for more powerful fans, thereby raising the operating costs for the system. The present invention requires only slightly more energy to operate the nozzle than a prior art system, but the increase in scrubbing efficiency obtained per added unit of energy input is far greater than can be obtained by the prior art methods of increasing efficiency. Thus, the present invention is a highly cost effective way to improve scrubbing efficiency. For example, it is estimated that a typical prior art design utilizing self-atomization would require a pressure drop across the venturi of 55 inches of water to achieve an overall collection efficiency of 99.3%. This, in turn would require the use of 15.4 horsepower per 1000 acfm. On the other hand, the venturi of the present invention can achieve a collection efficiency of 99.4% with a pressure drop across the venturi of only 16 inches of water, and requiring only 6.3 hp/acfm.

An alternate embodiment of the present invention is shown in FIG. 3, wherein the same numbers are used to identify the same parts shown in FIGS. 1 and 2. In the embodiment of FIG. 3, the precooling chamber 320 is stacked directly on venturi 350. Again, cooling may be accomplished by using a first spray nozzle 325 to reduce the heated effluent entering chamber 320 as shown by arrow 315. Two-fluid nozzle 380 is used to introduce droplets of a scrubbing liquid having a predetermined diameter. Unlike the venturi of the FIGS. 1 and 2 embodiment, the venturi of the FIG. 3 embodiment is not contained within a chamber, but rather, is free standing. After leaving the discharge cone of the venturi, the effluent gas flows into cyclonic separator 310, wherein the contaminant laden droplets are removed from the gas flow. Use of cyclonic separation to remove droplets is well known and need not be described in detail. In addition, an impingement plate 390 and/or a demister may also be used, if needed, to remove remaining droplets that are not removed by cyclonic separation.

Figure 3:
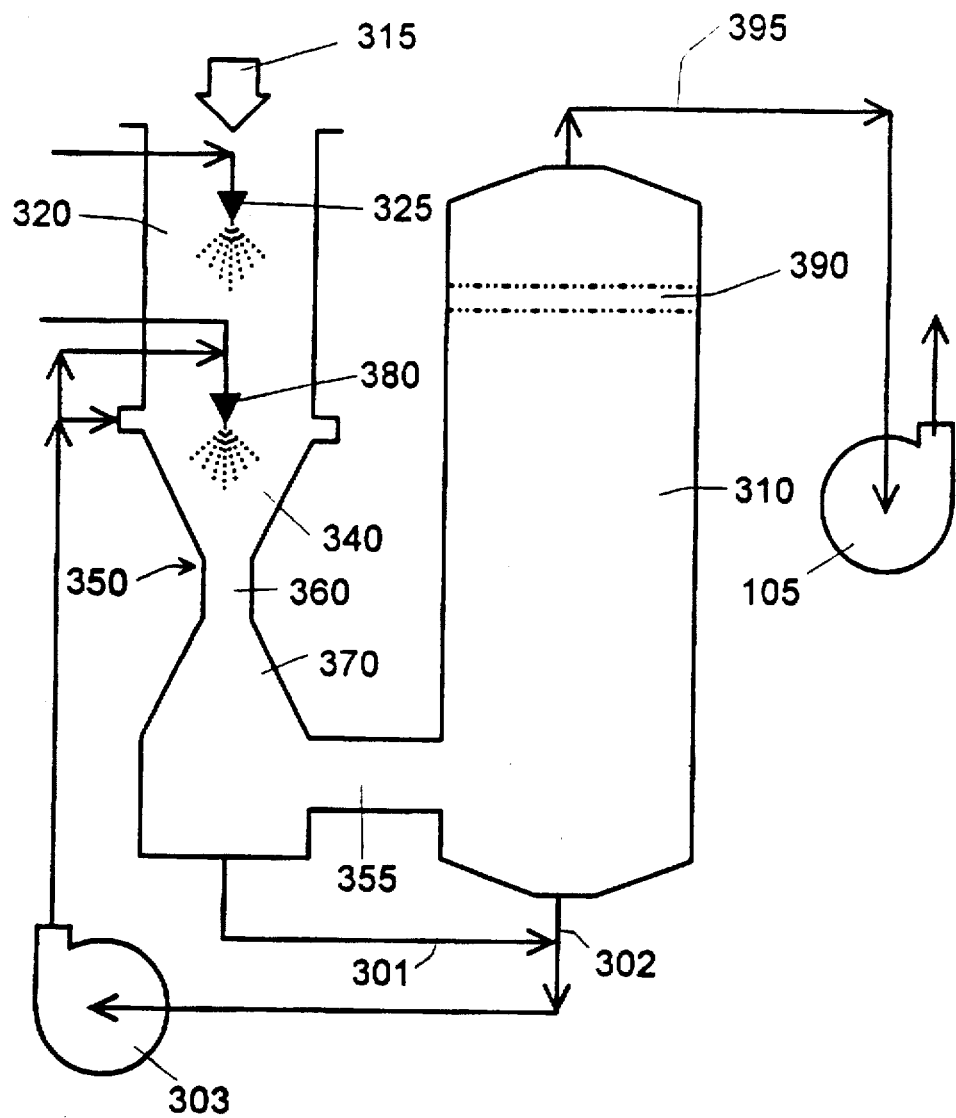
FIG. 3 is a partially schematic cross-sectional view of another embodiment of the venturi scrubber of the present invention.

As is shown schematically in FIG. 3, if the scrubbing liquid is scarce or otherwise valuable, the liquid used for scrubbing can be recycled to further reduce the operating cost of the system. The scrubbing liquid can be collected from the bottom of the venturi via line 301. Likewise, liquid can be collected from the bottom of cyclonic separator 310 via line 302. Pump 303 is then used to recycle the recovered liquid, which may first be filtered by conventional means (not shown). Other treatment techniques may be applied to the collected scrubbing liquid, as described in greater detail in connection with FIGS. 7 and 8. Where water supply is not a problem, such as with a municipal wastewater treatment works, it is preferable not to recycle the collected scrubbing liquid as described below.

Yet another embodiment of the present invention is shown in FIG. 4 wherein a plurality of venturis 450 are housed in a venturi chamber 430. Each of the venturis of the FIG. 4 embodiment are substantially the same, and are of similar design to the venturis shown in FIGS. 1 and 2. Nozzles 480 provide a spray of scrubbing liquid with droplets having a preselected optimal median diameter as described above. Preferably, the nozzles are two-fluid nozzles. The advantage of using multiple venturis is that it permits a more compact overall design and reduces the size of the individual nozzles. Smaller nozzles are better able to produce the fine scrubbing droplets of the present invention.

The embodiment of FIG. 4 also shows the use of multiple impingement plates. Two impingement stages 490 are located downstream of the venturis 450, and one impingement stage 495 is located upstream of the venturis. The use of multiple impingement plates is useful in collecting larger sized particles in addition to contaminant laden droplets from the venturi. For the reasons described above, scrubbing efficiency of the venturi is low in respect to particles which are roughly the same size as the droplets used for scrubbing, although larger particles are relatively easy to collect using other means.

The venturi designs of FIGS. 1, 2, and 4 are particularly well suited to retrofit existing pollution control equipment to improve scrubbing efficiency and lower operating costs. A typical existing system will include a venturi stage immediately after the incinerator (e.g., a multiple hearth furnace). This venturi stage feeds a second scrubber stage such as an impingement scrubber or cyclonic separator. In the case of venturi scrubber, the existing venturi may be replaced by a straight duct section, which serves as the precooling chamber, placed ahead of the venturi scrubber of the present invention. The induced draft fan is replaced or slowed to produce the desired pressure drop across the venturi of the present invention while saving substantial energy. To retrofit an existing low energy impingement scrubber, one or more venturis of the present invention may be housed in the impingement chamber or in an extension to the chamber after one or more of the impingement plates.

Figure 5:
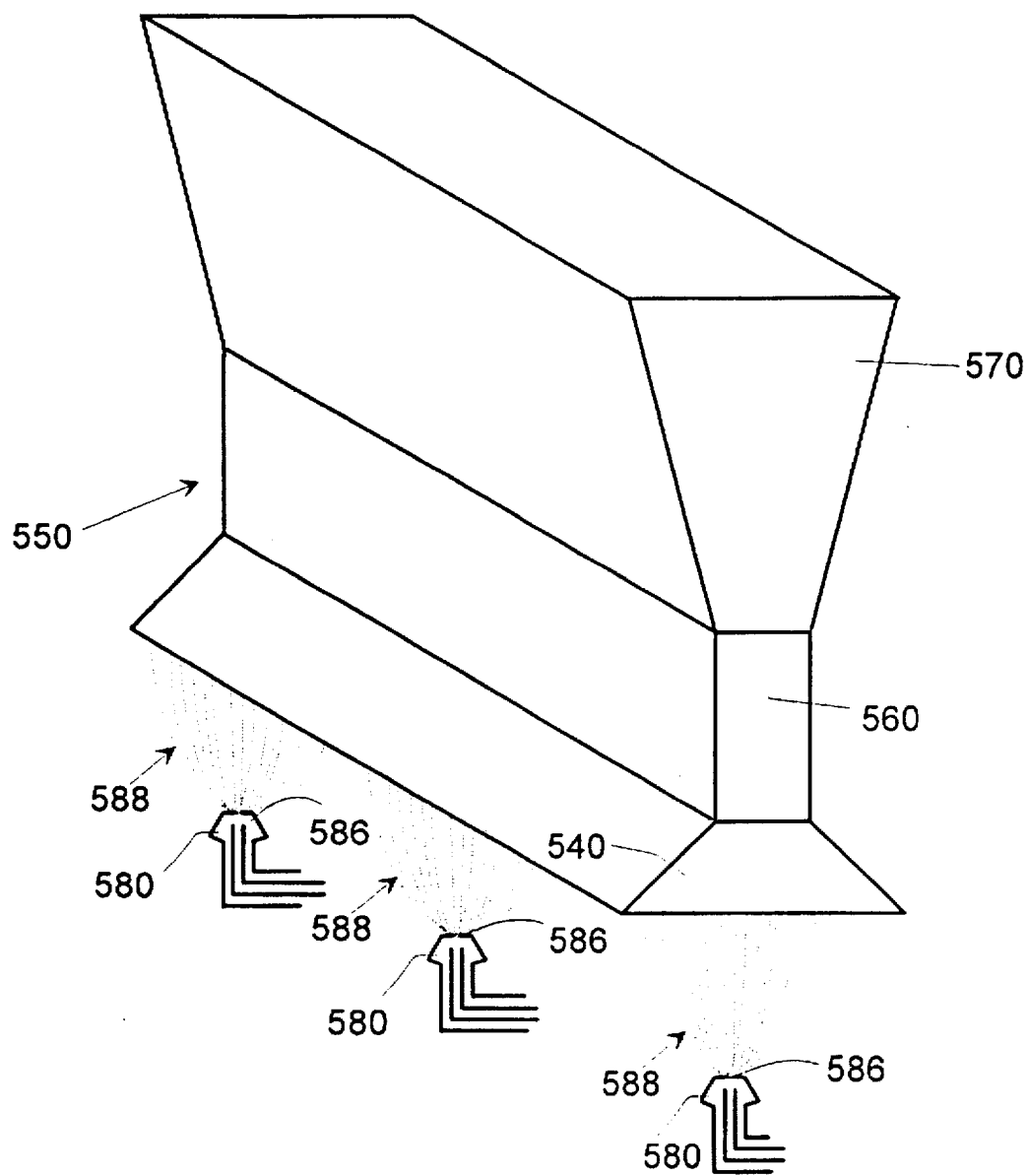
FIG. 5 is a partially schematic isometric view of yet another embodiment of the venturi of the present invention.

FIG. 5 is a partially schematic perspective view of yet another embodiment of the present invention wherein venturi 550 has an elongate shape and multiple nozzles 580 are used to inject a spray of droplets 588 into the effluent gas flow. Although for clarity three nozzles are shown, the number of nozzles used should be adequate to insure that the entire inlet 540 to venturi 550 is uniformly sprayed. Otherwise, there may be regions of gas flow that are not adequately scrubbed due to a reduced population of droplets. Preferably, each of nozzles 580 is of the two-fluid variety described above.

As noted above, in many applications, the properties of the flow of contaminated gas to a scrubbing system varies over time. For example, the volume of contaminated gas through the system and/or the particulate loading of the effluent gas flow may be variable. In such circumstances, while the scrubbing system must be capable of handling the worst case conditions (e.g., maximum particulate loading) it is not necessary to provide the same degree or type of treatment under all conditions. When conditions change there is an opportunity to save operating expenses by adjusting the air pollution control system to meet reduced requirements.

Figure 7:
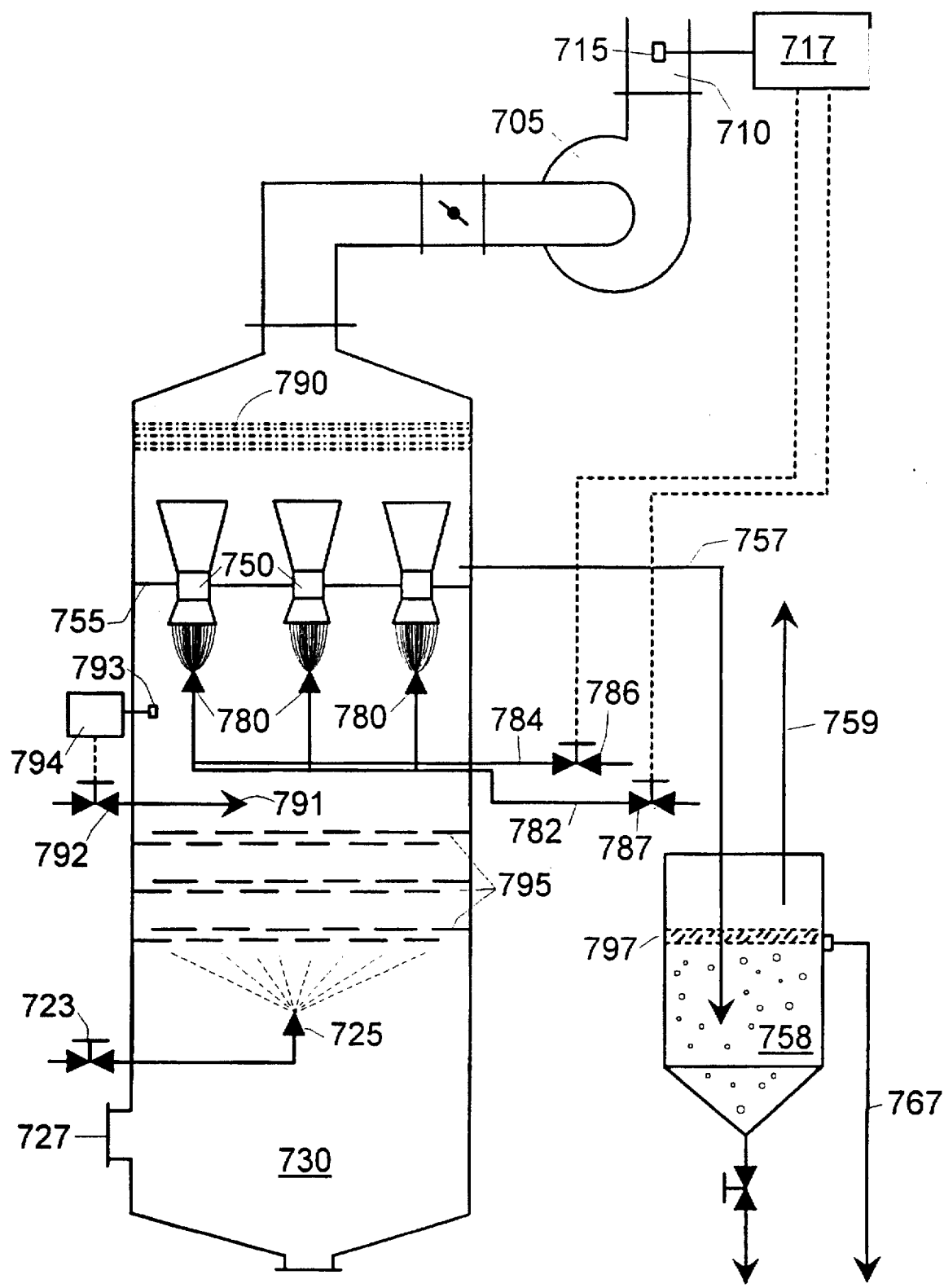
FIG. 7 is partially schematic cross-sectional view of a further embodiment of the present invention.
Figure 8:
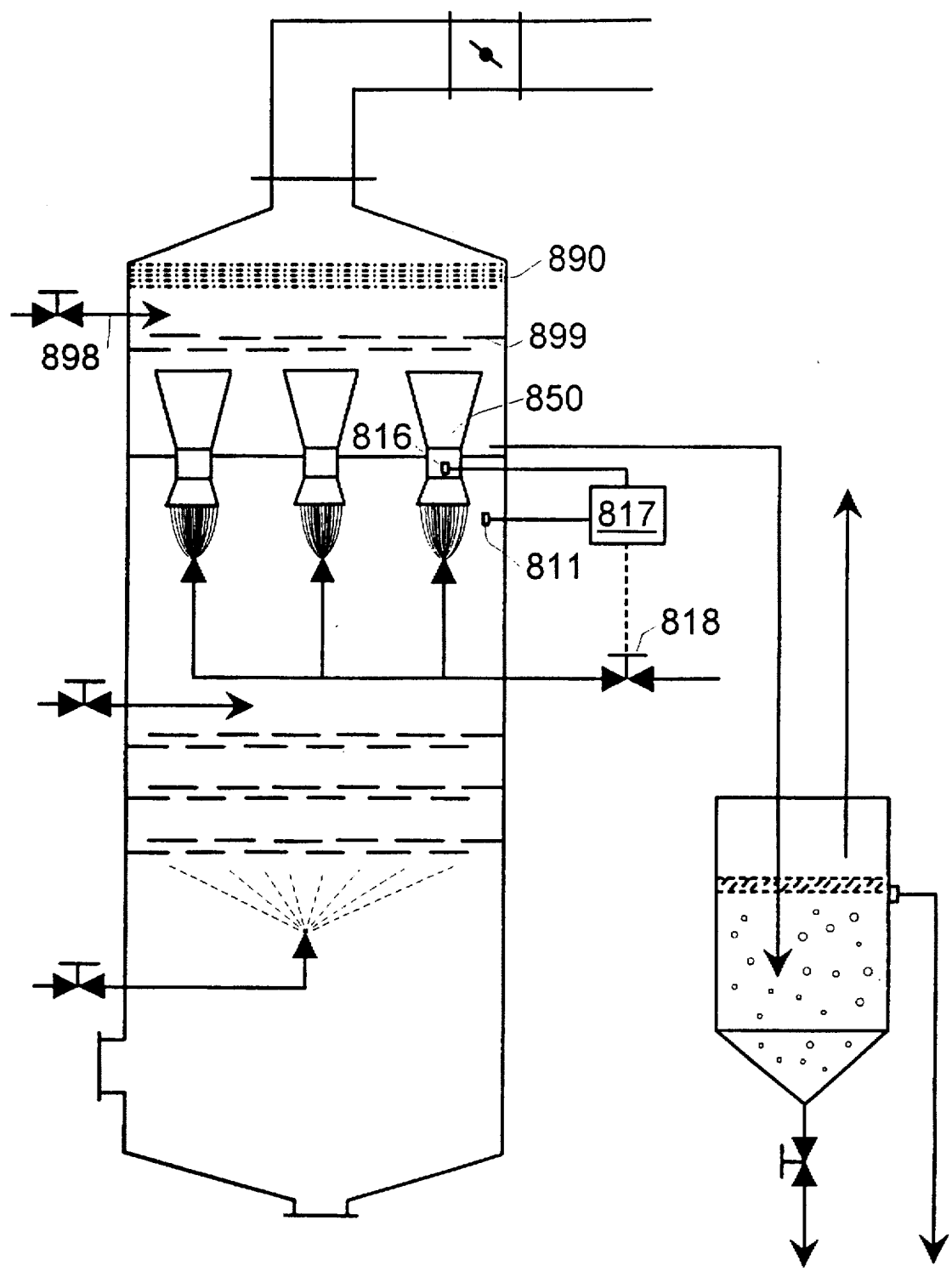
FIG. 8 is partially schematic cross-sectional view of another embodiment of the present invention.

FIGS. 7 and 8 show two embodiments of an air pollution control system employing a venturi scrubber which include automatic control functions to adjust the operation of the system to compensate for variations in the effluent flow. Turning first to FIG. 7, a scrubbing system similar to what is shown in FIG. 4 is depicted. A contaminated flow of particle-laden effluent gas enters enclosed chamber 730 through inlet 727. As described above, the effluent gas may be from a multiple-hearth furnace used to incinerate sludge from a municipal wastewater treatment works. Such a source of effluent gas will vary both in the volume of flow and in the characteristics of the flow. Upon entering chamber 730, the effluent flow first travels through a subcooling region, including three impingement plates 795. As described above, impingement plates 795 both serve to aid in the cooling of the gas flow and to remove larger particulates from the gas flow. A spray of cooling liquid is introduced into the gas flow upstream of impingement plates 795 by nozzle 725 which is controlled by valve 723. Liquid is also injected into the system above impingement plates 795 by liquid feed 791 controlled by valve 792. As is well known in the art, operation of the impingement plates 795 requires a liquid flow over them.

The three stages of impingement plates shown in FIG. 7 has an added operational advantage. Subcooling of the gases occurs within the impingement plate zone, and most of the subcooling occurs downstream of the first impingement plate. This allows removal of a substantial number of the larger particles in the effluent flow by the first impingement plate prior to any substantial cooling of the effluent gases. In this configuration, most of these larger particles will have been removed from the effluent when subcooling occurs. These larger particles are, thus, no longer available to serve as nucleation sites for condensation of vapors, thereby increasing the number of optically active fine particles which then serve as nucleation sites. In other words, the removal of the larger particles prior to subcooling prevents the larger particles from competing with the optically active particles as nucleation sites. As described above, it is desirable that the optically active particles increase in size due to condensation so that they are easier to remove from the effluent flow.

After passing through impingement plates 795, the subcooled effluent travels through venturi scrubbers 750, which are fed by spray nozzles 780, as described above. Thereafter, the spray droplets are captured by demister 790 which serves to reconsolidate the scrubbing liquid. Demisters, sometimes called mist eliminators, are well known to those skilled in the art, and are available in a number of different designs.

Demister 790 is, preferably, of the type which has a high efficiency in removing very fine droplets, such as one employing a mesh. After the scrubbing droplets have been removed, the cleansed effluent gas, which is propelled through the system by induced draft fan 705, may be expelled into the atmosphere through stack 710 or further processed.

Preferably, the scrubbing liquid used in the spray from nozzles 780 is at a relatively low temperature. Where the ambient temperature is not low, as may be the case in a warm climate or in summer months, the scrubbing liquid may be actively chilled. Chilling of the scrubbing liquid may be accomplished by any of a number of known techniques such as evaporative cooling or refrigeration. Use of chilled liquid further cools the effluent and increases the solubility of pollutant gases. Certain vapors, such as mercury, appear to be much more readily captured by chilled scrubbing liquid. Likewise, condensable hydrocarbons are also more readily captured with chilled scrubbing liquid. As described below, preferably the liquid is used only once and is kept at low temperature to avoid revolatilization of pollutant gases. Use of actively chilled liquid for subcooling is also beneficial, particularly in warm climates.

In one embodiment of the present invention, a particle monitor 715 is positioned within stack 710. Particle monitor 715 and its associated electronic circuitry in control module 717, keep track of the concentration of particles which are present in the flow of gases through the stack. Control module 717 is able to automatically adjust the valves 786, 787 which control the gas and liquid flow to two-fluid nozzles 780. While control module 717 is shown schematically as a single package, in an actual embodiment, separate physical modules may be used, for example, one module associated with the particle monitor and another with the valves for the two-fluid nozzle.

In accordance with one embodiment of the present invention, when the particle concentration in the effluent stream changes from a desired level, control module 717 adjusts valves 786, 787 to vary the spray into the venturi to effect a commensurate change in the particulate collection efficiency. The spray may be varied by either changing the volume of liquid that is sprayed or by changing the droplet size within the spray from nozzles 780. As noted above, two-fluid nozzles have the capability of independent control over droplet size and spray volume. Generally, the volume of liquid sprayed is determined by the liquid pressure or flow to the nozzle such that the liquid flow may be increased in response to a higher particle concentration reading. On the other hand, droplet size is determined by the gas pressure applied to or gas flow to the nozzle, such that an increased particle concentration may be used, in accordance with the present invention, to increase the gas pressure or gas flow to the nozzle, while leaving the liquid flow generally unaffected. Both the volume of spray and the droplet size may be simultaneously adjusted or they may be sequentially adjusted. For example, the control system may first increase the volume of spray to a target level and if the particle concentration has not been adequately reduced it may then decrease the droplet size.

A particle monitoring subsystem, of the type which is useful in connection with the embodiment of FIG. 7, may be obtained from the BHA Group, Inc., Kansas City, Mo. under the model designation CPM 1000™. This subsystem, which is based on LED technology and has an on-board microprocessor, provides a variable output voltage which may be used to control one or more valves. Changes in particle concentration may be averaged over user-determined periods of time to smooth out instantaneous variations in the measured particle concentration. In particular, the response time of the unit can be set anywhere between 0.1 to 999 seconds. Those skilled in the art will appreciate that other particle monitoring and control systems are equivalent and may also be used.

As shown in FIG. 7, it is preferred that particle monitor 715 be positioned downstream of fan 705 so that the gas has flowed through the fan before reaching the monitor. The energy of fan 705 slightly reheats the gas flow evaporating some of the extremely fine droplets that may have passed through the demister. This avoids including these droplets in the measurement of particle concentration.

Another control system according to the present invention is shown in FIG. 8, to which we now turn. The embodiment of FIG. 8 is generally similar to the embodiment of FIG. 7, however, rather than monitoring the concentration of particles in the effluent flow the volume of flow is monitored. As described above, the volume of effluent produced by many sources, such as an incinerator used to burn sludge produced by a wastewater treatment facility, may vary considerably over time.

The measurement of the pressure drop or pressure differential across a venturi is the principle upon which many commercial flow meters operate. In one embodiment of the present invention one of the venturis acts as part of a flowmeter for this purpose. A differential pressure gauge is used to calculate the gas flow. A pressure tap 816 positioned within the throat portion of one of the venturis is used to measure the pressure within the venturi throat and another pressure tap 811 is positioned within the venturi chamber upstream of the venturi throat. As is known in the art, the differential pressure is determined by subtracting the pressures measured at the two pressure taps. Preferably, pressure tap 816 is positioned near the entrance to the throat of the venturi such that the acceleration of water droplets sprayed into the throat does not affect the pressure tap reading. The pressure differential between the pressure taps 811 and 816 is measured by valve control module 817 which, in turn, automatically adjusts the spray introduced into venturis 850 in response to changes in the flow volume. A suitable differential pressure gauge for this purpose may be obtained from Dwyer Instruments, Inc., Michigan City, Ind., sold under the series designation 605. Those skilled in the art will appreciate that other differential pressure gauges may be used within one of the venturis or that equivalent approaches may be used to monitor the flow through the system.

When the flow through the venturi decreases, the acceleration of gases passing through the venturi likewise decreases. This adversely affects scrubbing efficiency which is related to the differential acceleration of the gases and the liquid droplets as they pass through the venturi. Thus, in accordance with a preferred embodiment of the present invention, when the system detects a reduced effluent gas flow, control module 817 responds by adjusting valve 818 to increase the volume of liquid which is sprayed into the venturi.

Rather than a two-fluid nozzle, FIG. 8 schematically shows hydraulic bypass nozzles. As indicated above, unlike typical single-fluid nozzles, hydraulic bypass nozzles allow independent control of the volume of spray without changing the size of droplets in the spray. A suitable hydraulic bypass nozzle, also called a bypass atomizing nozzle, may be obtained from the aforementioned Delavan, Inc. Hydraulic bypass nozzles are shown in connection with FIG. 8 for exemplary purposes only and a two-fluid nozzle, of the type previously described, may also be used.

As noted above, a chilled liquid may also be used for subcooling the effluent flow prior to its passage through the venturi stage. Automatic control according to the present invention may also be used for this purpose. In one embodiment, the temperature of the effluent flow in the system is monitored at a point between the final impingement plate and the entrance to the venturi stage. A temperature sensor 793 is shown in FIG. 7. Temperature sensor 793 is read by control means 794, and if the temperature rises the volume of liquid introduced by valve 792 is increased. Although more complex, those skilled in the art will appreciate that the temperature of the liquid introduced may also be adjusted.

Another aspect of the present invention is directed to the manner in which the scrubbing liquid is handled after it has passed through the venturi and become contaminated with particles and gases in the effluent flow. The handling of this waste liquid is depicted in FIG. 7 to which we now turn. Contaminated droplets of the scrubbing liquid are consolidated by demister 790 and flow under the influence of gravity down to tray 755 which separates the inlet ends of venturis 750 from the outlet ends. Tray 755 prevents any further downward flow of the contaminated spray liquid. Drain line 757 provides a flow path for the liquid which collects upon tray 755, carrying it to enclosed container 758.

According to Henry's law, the amount of gas absorbed by a given volume of a liquid is proportional to the partial pressure of the gas in contact with the liquid. Henry's law is applicable to relatively large volumes of liquid. However, very fine droplets of the type emitted by the venturi nozzles of the present invention, are able to absorb more gas than the amount prescribed by Henry's law. This phenomenon appears related to the relatively large surface area of fine droplets. Thus, when passing through the venturi the spray droplets absorb not only solid and liquid particles, but also large quantities of gases, (both contaminant gases and benign gases such as carbon dioxide). When using the very fine droplets of the present invention, the amount of gas absorbed by the scrubbing liquid absorbs gas in excess of the amount prescribed by Henry's law. When the scrubbing liquid is reconsolidated, Henry's law applies to the relatively large consolidated liquid volume and gas is, therefore, released from the consolidated scrubbing liquid.

As noted above, the scrubbing liquid is transported to enclosed container 758. The excess gas, which is created as described in the preceding paragraph, forms bubbles in the volume of reconsolidated scrubbing liquid stored in container 758. The used scrubbing liquid is, therefore, naturally effervescent. As bubbles formed within the liquid rise to the surface they transport some of the suspended particles that had been trapped in the scrubbing droplets to the surface forming a scum 797 on the surface. This scum, consisting of trapped particles, is easily removed from the surface of the liquid by conventional means. Thus, according to the present invention, the natural effervescence of the reconsolidated scrubbing liquid is used in the removal of a substantial portion of the particles that have been trapped in the scrubbing fluid.

Some of the gases which escape from the scrubbing fluid due to its natural effervescence are pollutants which should not be released into the atmosphere. Accordingly, the gases released in container 758 are transported by gas flow line 759 for further treatment. The further treatment may consist of incineration, as when the pollutant gases contain a high concentration of hydrocarbons. Alternatively, the contaminant may be removed by passing them through an activated carbon adsorber. Other, equivalent, methods of treating the released gases are well known to those skilled in the art and may also be used.

In order to avoid the re-release of pollutant gases into the scrubbing chamber after the spray droplets have been reconsolidated by demister 790, every effort is made to ensure that the reconsolidated liquid is quickly drained off to container 758. To this end, plate 755 may be sloped to promote drainage (not shown) and more than one drain outlet may be used (not shown). In addition, the drain outlet(s) may be placed at or below the lowest level of plate 755 so that liquid does not accumulate on the plate. As shown in FIG. 8, an impingement plate 899 may be used between the venturis and demister 890. Use of impingement plate 899 causes more rapid reconsolidation and removal of the used scrubbing droplets, thereby reducing the time during which the scrubbing liquid remains in the venturi chamber and minimizing the re-release of gases.

As has been described, by virtue of its natural effervescence, the reconsolidated scrubbing liquid in container 758 releases a substantial amount of pollutant gas and collects a substantial amount of suspended solids in an easily removed surface scum. Other solids will sink to the bottom of container 758 where they can be removed by conventional means. (However, due to the very small size of the particles trapped by the scrubbing liquid, not much sedimentation will normally occur.)

In accordance with the present invention, further treatment of the remaining liquid may also be performed. For example, chemistry of the liquid may be continuously monitored, and treatment chemicals added automatically in response to such monitoring. In one embodiment, the pH of the liquid is monitored and an appropriate chemical, such as lime, is added whenever the pH of the liquid is too low. Chemical treatment may also involve addition of precipitants to remove noxious compounds from the liquid.

The liquid is drained from container 758 using overflow drain line 767 which maintains the level of liquid in container 758 at a constant height. The overflow liquid may be filtered or further treated and recycled if necessary. In a system where the scrubbing liquid is water and an ample supply of water exists, such as in connection with a municipal wastewater treatment facility, the reconsolidated scrubbing liquid is, preferably, not recycled. Unless the reconsolidated water is thoroughly treated and all the pollutant gases removed, reuse of the water may result in reinjection of pollutants into the stack. Instead, the scrubbing water may be reintroduced into the headwaters of the treatment works for further treatment there.

While the present invention has been described in conjunction with preferred embodiments thereof, it will be apparent to those skilled in the art that there are many variations and equivalents of that which has been described. For example, while the present invention has been described so as to optimize the collection of optically active particles, in certain applications it may be desired to increase the collection efficiency of particles within a different size range. Accordingly, it is intended that the invention should be limited only by the following claims.

What is claimed is:

1. An air pollution control system for cleansing a particulate-laden flow of gas, said system comprising:

a venturi scrubber;

nozzle means for introducing a spray of liquid droplets into said venturi scrubber, the spray from said nozzle means being controllable such that the volume of liquid sprayed by said nozzle means may be adjusted without affecting the size of the droplets;

flow measuring means for determining the volume of gas flowing through said venturi scrubber; and liquid flow control means for adjusting the volume of liquid sprayed by said nozzle, said liquid flow control means being responsive to said flow measuring means such that the volume of liquid sprayed into said venturi scrubber may be varied as a function of the volume of gas flowing through said venturi scrubber;

wherein said liquid flow control means increases the volume of liquid being sprayed by said nozzle means when the volume of gas flowing through said venturi scrubber decreases.

2. The air pollution control system of claim 1 wherein said nozzle means comprises a two-fluid nozzle.

3. The air pollution control system of claim 1 wherein said nozzle means comprises an hydraulic bypass nozzle.

4. The air pollution control system of claim 1 wherein said flow measuring means comprises means for measuring the pressure differential in the venturi.

5. The air pollution control system of claim 1 further comprising means to actively cool the liquid sprayed by said nozzle.

6. The air pollution control system of claim 1 further comprising a plurality of individual venturi scrubbers providing parallel flow paths through the system, each of said venturi scrubbers having at least one nozzle means associated therewith.

7. A method of cleansing a particulate-laden flow of gas, comprising the steps of:

flowing said particulate-laden gas through a veturi scrubber, introducing a spray of a scrubbing liquid into said venturi scrubber, determining the volume of gas flowing through said veturi scrubber, and, adjusting the volume of liquid sprayed into said venturi scrubber as a function of the volume of gas flowing through said venturi scrubber without substantially changing the size of the liquid droplets within said spray, such that the volume of liquid sprayed into said venturi scrubber is increased when the volume of gas flowing through said venturi scrubber decreases.

8. The method of claim 7 wherein the step of determining the volume of gas flowing through the venturi scrubber comprises monitoring the pressure differential within the venturi.

9. The method of claim 7 further comprising the step of cooling said scrubbing liquid prior to introducing said spray.

* * * * *

UNITED STATES PATENT AND TRADEMARK OFFICE
CERTIFICATE OF CORRECTION

PATENT NO. : 5,759,233
DATED : June 2, 1998
INVENTOR(S) : James J. Schwab

It is certified that error appears in the above-indentified patent and that said Letters Patent is hereby corrected as shown below:

Column 3, line 29, after "F" delete ".".

Column 4, line 52, after "is" insert --to--.

Column 5, line 23, after "independent" delete ",".

Column 6, line 15, after "is" insert --a--.

Column 6, line 17, after "is" insert --a--.

Column 6, line 44, delete "know" and substitute therefor --known--.

Column 7, line 66, delete "two fluid" and substitute therefor --two-fluid--.

Column 8, line 17, delete "two fluid" and substitute therefor --two-fluid--

UNITED STATES PATENT AND TRADEMARK OFFICE
CERTIFICATE OF CORRECTION

PATENT NO. : 5,759,233
DATED : June 2, 1998
INVENTOR(S) : James J. Schwab

It is certified that error appears in the above-indentified patent and that said Letters Patent is hereby corrected as shown below:

Column 15, line 66, before "may" insert --gases--.

Column 18, line 5, delete "veturi" and substitute therefor --venturi--.

Column 18, line 9, delete "veturi" and substitute therefor --venturi--.

Signed and Sealed this

Second Day of November, 1999

*Attest:*

Q. TODD DICKINSON

*Attesting Officer*   Acting Commissioner of Patents and Trademarks

UNITED STATES PATENT AND TRADEMARK OFFICE
CERTIFICATE OF CORRECTION

PATENT NO. : 5,759,233
DATED : June 2, 1998
INVENTOR(S) : James J. Schwab

It is certified that error appears in the above-identified patent and that said Letters Patent is hereby corrected as shown below:

Column 3,
Line 29, after "F" delete ".".

Column 4,
Line 52, after "is" insert -- to --.

Column 5,
Line 23, after "independent" delete ",".

Column 6,
Lines 15 and 17, after "is" insert -- a --.
Line 44, delete "know" and substitute therefor -- known --.

Column 7,
Line 66, delete "two fluid" and substitue therefor -- two-fluid --.

Column 8,
Line 17, delete "two fluid" and substitue therefor -- two-fluid --.

Column 10,
Line 55, delete "hp/acfm" and substitute therefor -- horsepower per 1000 acfm --

Column 15,
Line 66, before "may" insert -- gases --.

UNITED STATES PATENT AND TRADEMARK OFFICE
CERTIFICATE OF CORRECTION

PATENT NO.    : 5,759,233
DATED         : June 2, 1998
INVENTOR(S)   : James J. Schwab It is certified that error appears in the above-identified patent and that said Letters Patent is hereby corrected as shown below:

Column 18,
Lines 5 and 9, delete "veturi" and substitute therefor -- venturi --.

Signed and Sealed this

Eleventh Day of June, 2002

Attest:

Attesting Officer

JAMES E. ROGAN
Director of the United States Patent and Trademark Office